July 12, 1938.    H. KATTWINKEL    2,123,307
FLEXIBLE UNIVERSAL COUPLING
Filed Sept. 8, 1936
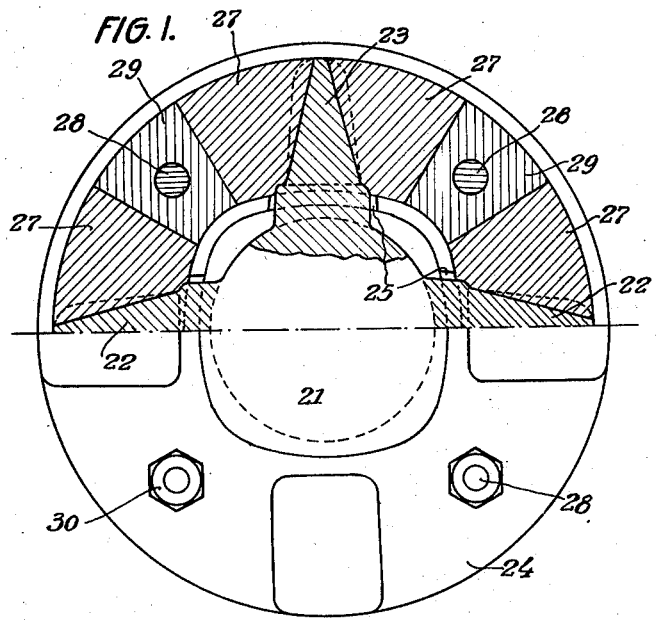
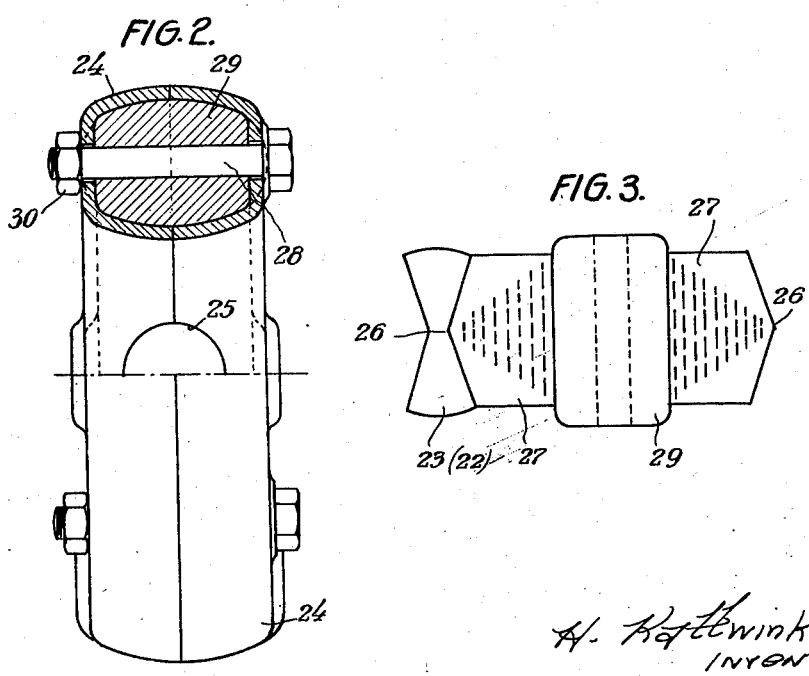

Patented July 12, 1938

2,123,307

UNITED STATES PATENT OFFICE 2,123,307

FLEXIBLE UNIVERSAL COUPLING

Hans Kattwinkel, Coswig, Germany

Application September 8, 1936, Serial No. 99,871
In Germany September 9, 1935

10 Claims. (Cl. 64—14)

My invention relates to universal couplings (Cardan joints) especially used in motor vehicles for the connection of the gear shaft with the differential shaft.

Couplings of the class referred to are known in which the transmission of the power between the forked heads or spiders of the shafts to be coupled is effected by means of elastic intermediate blocks arranged in an annular casing into which the arms of the forked heads or spiders project from the centre in such a way that two neighbouring arms are separated from each other by one or several elastic intermediate blocks. It is of importance that the elastic intermediate blocks in such couplings are subjected to a considerable initial compression. The said compression may be applied to the blocks at their insertion into the annular casing by correspondingly dimensioning the blocks relatively to the dimensions of the available spaces in the casing, or the initial compression may be applied after the insertion of the blocks by means of a special tensioning device. Through the application of such initial compression considerable difficulties arise in the case that as usually the intermediate blocks are made of vulcanized rubber. A highly elastic rubber is very desirable for a good efficiency of the transmission of the power, but in this case a very high initial compression is necessary for realizing the taking up of the circumferential forces by the smallest possible lever arms to avoid too large dimensions of the coupling. Hence the drawback results that the soft rubber enters forcibly into the intermediate spaces between the arms of the forked heads and the respective receiving openings of the casing of the coupling, and that the soft rubber is squashed or otherwise damaged within the said spaces in course of time. The said damages are easily transmitted to the other parts of the rubber bodies. In the case that for avoiding the mentioned drawback the intermediate blocks of the coupling are made of a relatively hard rubber the efficiency of power transmission is on the one hand decreased on account of the small elasticity of such rubber, because at the frequently occurring driving stresses constituted by jerks and at large angular deviations between the coupled shafts only a small percentage of the work absorbed by the compression of the rubber is recovered at release, whereas on the other hand intermediate blocks made of hardened soft rubber are soon demolished on account of the considerable internal friction.

Now, I have found, that it is possible to combine the advantage of the good elasticity of the soft rubber with the advantage of a great power of resistance and a great absorbing capacity for high stresses of the hardened soft rubber and to avoid thereby the drawbacks of the mentioned sorts of rubber by manufacturing the intermediate blocks of a material designated in the following with "felt rubber", which material consists of soft rubber intimately and uniformly interspersed with fibres and made for example by the method described further below.

Accordingly an object of my invention is the provision of an elastic universal joint of the class referred to in which the elastic intermediate blocks between the arms of the forked heads or spiders essentially consist of felt rubber.

Another object of my invention consists in providing special means for applying at will an initial compression to the elastic intermediate blocks of couplings of the class referred to.

Other objects and features of my invention will be apparent from the following part of the specification and characterized in the claims.

In the drawing in which two preferred embodiments of my invention are illustrated by way of example Fig. 1 shows a universal joint according to my invention, which is seen in the direction of the axis, the upper half of the figure being a partial median cross-section and the lower half being a partial end view.

Fig. 2 shows in its upper half a partial radial section and in the lower half a partial side view of the joint or coupling.

Fig. 3 shows a pair of the elastic intermediate blocks seen in a radial direction.

In Fig. 1 the shaft carrying the forked head 22 is designated with 21. Of the forked head of the other shaft only a portion of the one arm 23 is illustrated in Fig. 1. In Fig. 2 the shafts and the forked heads are totally omitted.

The arms 22 and 23 project through openings 25 into the interior of the annular casing 24 which consists of two symmetrical halves, the said openings allowing a certain play of the arms. Between an arm 22 and an arm 23 two intermediate blocks 27, 27 are located consisting preferably of "felt rubber", and between the said two blocks a third rubber block 29 is intercalated which is traversed by a screw-bolt 28 serving simultaneously for holding the two halves of the casing together. With distinction from the cross-sectional profile of the intermediate blocks 27 corresponding with the clear profile of the cavity of the casing 24 the intervening block 29 has as indicated by the curved dotted lines in the upper part of Fig. 2 a considerably larger extension in the axial direction, so that at a compression of the blocks 29 in the axial direction effected by a tightening of the nuts 30 the intermediate blocks 27 are compressed in the circumferential direction to obtain the necessary previous tension.

The blocks 29 are preferably made of a rubber which is softer than that of the intermediate blocks 27. Instead of manufacturing the intermediate blocks 27 and the central blocks 29 of a homogeneous rubber or of rubber felt also a rubber reinforced by insertions of textile fabric may be used as material for the blocks 27, the superficial dimensions of the insertions preferably growing in the direction from the arms 22 and 23 of the forked heads to the intervening block 29 as indicated in Fig. 3. On the vertex 26 of the intermediate blocks 27 or on the arm of the forked head engaging the said vertex the smallest variations of positions occur at angular deviations. Hence the respective local reduction of the dimensions of the insertions of the intermediate blocks 27 offers the further advantage that very slight motions and milling actions take place at the point of the transmission of the power. Thus excessive heat and excessive wear is avoided.

The "felt rubber" used with special advantage as material for the elastic intermediate blocks is made for example according to the following method:

When using the fibres of cotton as filling material for the rubber it is preferable to proceed from a fleece of cotton fibres produced in the carding machines of cotton-spinning mills. This fleece together with a band of corresponding breadth of raw rubber combined with a vulcanizing agent is wound up to a roll, whereby the fleece of fibres is squeezed into the relatively soft material of the rubber band, so that the fleece sticks to the band. As the fleece of fibres produced in the carding machine is very thin and loose and possesses a very small power of resistance to tearing, the fleece is fed together with a carrying paper band to the reel on which the fleece and the rubber band has to be rolled, the paper band and the fleece having previously been wound up to a roll. In this way a roll is formed the layers of which consist alternately of paper, fibre-fleece and rubber. This roll is then unrolled, whereby the paper-band is carefully taken off. The fibre-fleece is caught by the rubber and the compound band thus made is fed to a table on which the band is subdivided by transverse cuts into pieces of about square shape.

About twenty of the said pieces are piled up, and the so formed staples are compressed in a press under a relatively slight pressure. The plates manufactured in this way with a thickness of about 5 millimetres are then divided into small pieces corresponding in shape and size approximately with the cross-section of the elastic intermediate blocks. A number of these small pieces is piled up to form a staple the height of which corresponds approximately with the length of the intermediate block which has to be manufactured. These staples are brought into the approximate shape corresponding with the final shape of the intermediate blocks and are vulcanized under the influence of pressure and heat in a vulcanizing mould the cavities of which correspond exactly with the final shape of the intermediate blocks which have to be inserted into the coupling. After having been taken out of the moulds the blocks may directly be inserted into the coupling. Thereby the before mentioned previous tension may be applied by enlarging the dimensions of the intermediate blocks especially in the circumferential direction relatively to the respective dimensions of the cavities of the casing of the coupling taking up the said intermediate blocks, or after the insertion of the intermediate blocks into the casing of the coupling the desired previous tension may be subsequently applied to the blocks by special tensioning devices which are provided on the said casing and which exert on the intermediate blocks an additional pressure preferably in the circumferential direction, the dimensions of the intermediate blocks corresponding in this case substantially with the clear dimensions of the cavities receiving the said blocks.

The manufacture of the rubber felt serving as material for the intermediate blocks may also be executed in another way. The fibre-fleece may for instance be impregnated with a solution of rubber or latex by feeding the fleece for instance through a vessel containing the solution. After a shallow squeezing out of the rubber-solution a greater number of layers of the impregnated pieces of fibre-fleece are piled up and compressed. The plate thus formed is then divided according to the above described method into pieces corresponding with the approximate cross-sectional shape of the intermediate blocks to be manufactured, and these plates are as described above piled up to the approximate block-shape, and the blocks are trimmed and vulcanized, through which method the final shape of the intermediate blocks is achieved.

The cotton fibres may naturally be substituted by another fibrous material, such as for instance by wool or by wastes of silk-spinning works and the like. It is essential that the original fibres of the filling material and not fibres worked to threads or even to fabrics are embedded into the rubber mass, so that the rubber sheathes every individual fibre, thus realizing an especially intimate connection of the rubber with the fibrous material, which connection resists to the strongest milling stresses without a considerable decrease of the elasticity. Regardless of its relatively high elasticity the "felt rubber" is under the high pressure not brought into such a plastic state that it might forcibly enter into the intervening spaces between the arms of the forked heads and the cavities of the casing of the coupling receiving the said arms and into other gaps and deepenings and might there be demolished by the "working" of the halves of the coupling as it is the case with soft rubber.

I claim:

1. A universal joint comprising: two forked heads having each at least two arms, elastic bodies between the arms of the one and the arms of the other forked head, a casing covering the said elastic bodies and having a clear cross-section of substantially the same dimensions as the cross-section of the said elastic bodies and additional elastic bodies co-operating with the said first mentioned elastic bodies and having considerably larger cross-sectional dimensions than the first-mentioned bodies.

2. A universal joint comprising: two forked heads having each at least two arms, elastic bodies between the arms of the one and the arms of the other forked head, a casing covering the said elastic bodies and having a clear cross-section of substantially the same dimensions as the cross-section of the said elastic bodies and additional elastic bodies co-operating with the first-mentioned elastic bodies and having considerably larger cross-sectional dimensions than the first-mentioned bodies and means for reducing the cross-sectional dimensions of the additional elastic bodies.

3. A universal joint comprising: two forked heads having each at least two arms, elastic bodies between the arms of the one and the arms of the other forked head, a casing covering the said elastic bodies and having a clear cross-section of substantially the same dimensions as the cross-section of the said elastic bodies, additional elastic bodies co-operating with the first-mentioned elastic bodies and having considerably larger cross-sectional dimensions than the first-mentioned bodies and means for reducing the cross-sectional dimensions of the said additional elastic bodies in the axial direcction.

4. A universal joint comprising: two forked heads having each at least two arms, elastic bodies between the arms of the one and the arms of the other forked head, a casing covering the said elastic bodies and having a clear cross-section of substantially the same dimensions as the cross-section of the said elastic bodies, additional elastic bodies co-operating with the said first-mentioned elastic bodies and having considerably larger cross-sectional dimensions than the first-mentioned bodies and means for reducing the cross-sectional dimensions of the said additional elastic bodies in the axial direction, the said means consisting of screw members traversing the said additional elastic bodies in the axial direction.

5. A universal joint comprising: two forked heads having each at least two arms, elastic intermediate bodies between the arms of the one and the arms of the other forked head, a split casing covering the said elastic intermediate bodies and having a clear cross-section of substantially the same dimensions as the cross-section of the said elastic bodies and additional elastic bodies co-operating with the first-mentioned elastic bodies and having considerably larger cross-sectional dimensions than the first-mentioned bodies and screw-bolts traversing the said casing and the said additional elastic bodies in the axial direction.

6. A universal joint comprising: two forked heads having each at least two arms, pairs of elastic intermediate pieces between the arms of the one and the arms of the other forked head, a casing covering the said pairs of intermediate pieces, an elastic body the cross-sectional dimensions of which are considerably larger than the dimensions of the clear cross-section of the said casing, the said elastic body being intercalated always between two intermediate pieces of the said pairs of intermediate pieces and screw-bolts traversing the said casing and the said elastic body.

7. A universal joint comprising: two forked heads having each at least two arms, pairs of elastic intermediate pieces between the arms of the one and the arms of the other forked head, a casing covering the said pairs of intermediate pieces, an elastic body having considerably larger cross-sectional dimensions than the clear cross-section of the said casing, the said elastic body being intercalated always between two intermediate pieces of the said pairs of intermediate pieces and firmly connected with the said two pieces and screw-bolts traversing the said casing and the said elastic body in the axial direction.

8. A universal joint, comprising: two forked heads having each at least two arms, pairs of elastic intermediate pieces arranged between the arms of the one and the arms of the other forked head, a split casing covering the said pairs of intermediate pieces, an intervening body consisting of a rubber which is softer than the rubber of the said intermediate pieces, the said intervening body having considerably larger cross-sectional dimensions than the clear cross-section of the said casing, the said elastic body being interposed between two intermediate pieces of the said pairs of intermediate pieces, and screw-bolts traversing the said casing and the said elastic body in an axial direction.

9. A universal joint, comprising: two forked heads having each at least two arms, pairs of elastic intermediate pieces arranged between the arms of the one and the arms of the other forked head, a split casing covering the said pairs of intermediate pieces, an intervening body consisting of a rubber which is softer than the rubber of the said intermediate pieces and having considerably larger cross-sectional dimensions than the clear cross-section of the casing, the said elastic body being interposed between two intermediate pieces of the said pairs of intermediate pieces, screw-bolts traversing the said casing and the said elastic body, and insertions of textile fabric being arranged in spaced relation within said intermediate pieces.

10. A universal joint comprising: two forked heads having each at least two arms, pairs of elastic intermediate pieces arranged between the arms of the one and the arms of the other forked head, a split casing covering the said pairs of intermediate pieces, an intervening body consisting of a rubber which is softer than that of the said intermediate pieces and having considerably larger cross-sectional dimensions than the clear cross-section of the said casing, the said elastic body being interposed between two intermediate pieces of the said pairs of intermediate pieces, screw-bolts traversing the said casing and the said elastic body in an axial direction, and a plurality of insertions of textile fabric within said intermediate pieces, the areas of said insertions being gradually reduced in the direction towards the ends of the intermediate pieces adjacent the arms of said forked heads.

HANS KATTWINKEL.